GEORGE R. MENEELY.

Improvement in Journal-Boxes.

No. 127,784.  Patented June 11, 1872.

Witnesses  
C. D. Killum  
E. Cowan

Inventor  
Geo. R. Meneely 127,784

UNITED STATES PATENT OFFICE.

GEORGE R. MENEELY, OF WEST TROY, NEW YORK.

IMPROVEMENT IN JOURNAL-BOXES.

Specification forming part of Letters Patent No. 127,784, dated June 11, 1872.

*To all whom it may concern:*

Be it known that I, GEORGE R. MENEELY, of West Troy, in the county of Albany and State of New York, have invented a new and Improved Car-Box or Axle-Bearing for Railway Cars and Machinery; and I do hereby declare the following to be a full, clear, and exact description of the same.

Figure 1:
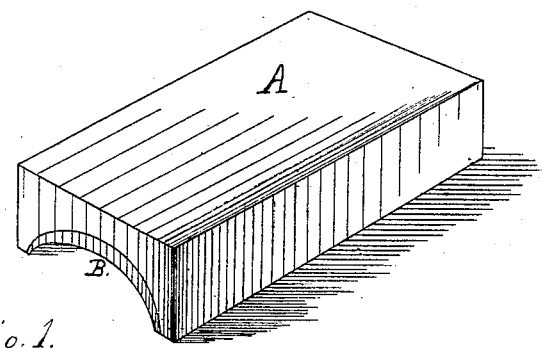
Figure 2:
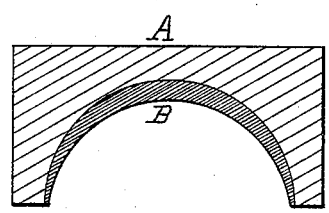

In the accompanying drawing, Figure 1 is a perspective view of my improved car-box or axle-bearing, hereinafter described; and Fig. 2 is a sectional view of the same.

Heretofore and now car-boxes or axle-bearings have been and are made entirely of a composition of copper, tin, or other copper alloy approximating bell-metal. These boxes generally weigh from six to ten pounds each, and the metal of which they are composed is worth from thirty to forty cents per pound. It is desirable to have these boxes or bearings as hard as possible to resist the wear that the constant friction to which they are exposed subjects them; but as now constructed, and owing to the weight sustained by them, and hence their liability to break, it is impossible, or at least undesirable, to make them as hard as the use they are put to would naturally require. The object of my invention is to obviate these difficulties, and to furnish a box or bearing which, while being from thirty to forty per cent. cheaper than those now in use, will allow of the use of harder metal at the bearing-point, and hence increase its durability, and also furnish a bearing not liable to crack or break in a manner to destroy its usefulness. My invention consists substantially in constructing a car-box or axle-bearing of an outer jacket of wrought-iron, enveloping and protecting a brass, bronze, or bell-metal bearing, said outer jacket of wrought-iron being firmly welded to the bronze-metal bearing; the whole being constructed and operating substantially in the manner and for the purposes hereinafter described.

To enable others skilled in the art to which my invention relates to make and use the same, I will here proceed to describe the construction and operation thereof, which is as follows, to wit:

I design to construct about five-sevenths ($\frac{5}{7}$) of my improved box or bearing of wrought-iron. The part I design to so construct is the outside portion of the box, or that part not coming in direct contact with the axle. This outer jacket of wrought-iron (marked A at both figures) may be rolled from the pig in the usual manner and sawed into pieces of the desired length. Any desired form or shape may be used, according to the requirements of the bearing sought to be made; and in car-boxes one side of this wrought-iron jacket A should be grooved or recessed to sufficient depth to allow the bronze or other metal bearing B to be welded thereto, and yet when completed form the segment of a circle to conform to the shape of the axle, in connection with which it is to be used. The bronze-metal bearing B may be of any thickness suitable for the purpose, and I securely weld the same in the groove or inner side of the wrought-iron jacket or body of the box A, by means of any process that may be deemed best adapted for that purpose; preferring, however, the process described in an application for a patent made by me, and bearing even date herewith, this process being simply the continued pouring of the bronze metal in a highly-heated state over the wrought-iron surface, said iron surface being thoroughly cleaned preparatory thereto, until the fibers of the iron and bronze metal uniting form a perfect weld; when the desired quantity of such bronze or brass is, by means of a proper mold, united to and with such wrought-iron jacket A. This bearing of brass, bronze, or bell-metal should be thicker at the center of the jacket A, where the principal weight and consequently most friction would occur, than at the sides, where there would be comparatively little wear.

By the use of this wrought-iron jacket A, enveloping and surrounding the bronze or other metal bearing B, and being firmly welded thereto, I am enabled to use a much harder alloy for the direct bearing, for the reason that even should it, by reason of its brittleness, break or crack, it can do no harm, for the wrought-iron jacket A will remain firm, and being securely welded to and enveloping the bearing it cannot get out of place, but will wear equally as well as if entirely whole. When the bronze-metal bearing B has become worn out, or worn to that extent that it is desired to replace it with a new one, the old box or bearing can be utilized or made into a new one by simply heating it to a high temperature and then knocking out what remains of the old brass bearing B, and welding to it, by the process before described, a new bearing of hard metal. The wrought-iron jacket A, upon which there is but little if any wear, would obviously answer for the main portion of many car-boxes or bearings considered as a whole, and would stand many renewals of bronze or hard-metal bearings.

By the means above described I am enabled to construct a car-box or axle-bearing which, while being much cheaper than those now in use, possesses also many advantages which would recommend it for general use.

What I claim as new and my invention, and desire to secure by Letters Patent of the United States, is—

As an article of manufacture an axle-bearing for railway cars, machinery, &c., composed of a wrought-iron jacket, A, and an inner bearing surface of brass, bronze, or other hard metal B, when the two are solidly united by casting the latter upon the former, substantially as herein set forth.

In testimony whereof I have hereunto set my hand this 22d day of January, 1872.

GEO. R. MENEELY.

Witnesses:
T. W. GETMAN,
C. D. KELLUM.